Aug. 18, 1931.  E. B. STALEY  1,819,393
DRAWBAR CONNECTION
Filed May 29, 1929  2 Sheets-Sheet 2
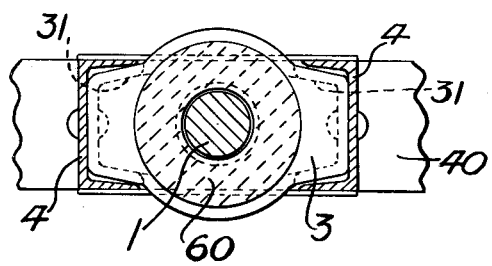
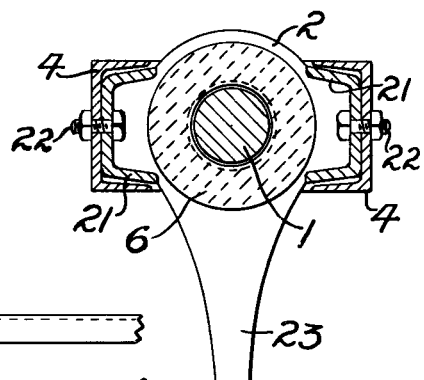
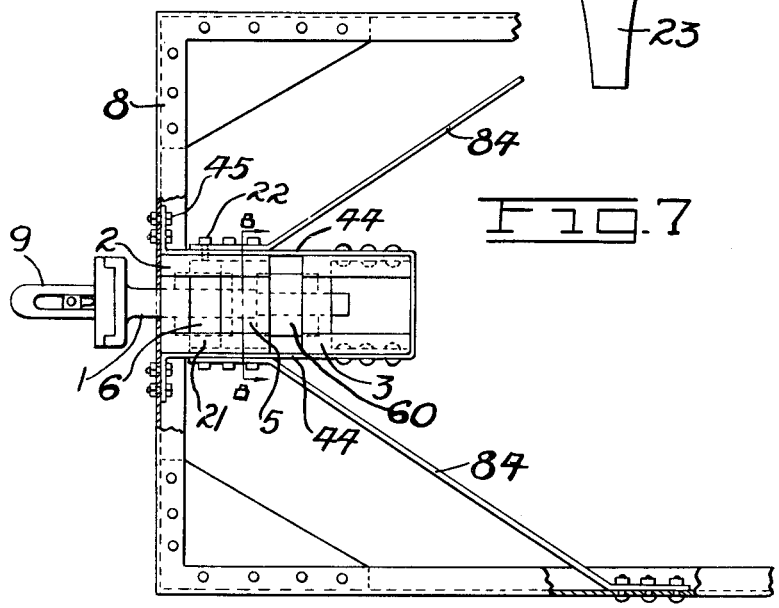
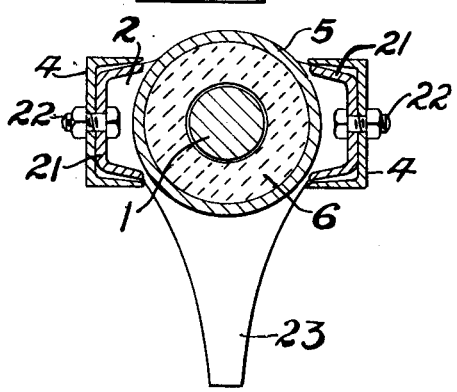
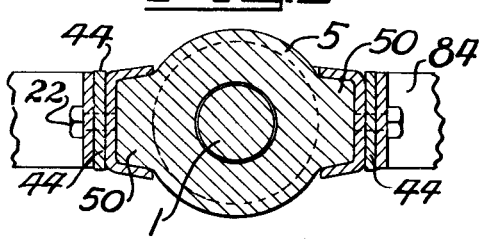
Inventor
Earl B. Staley
By Reynolds & Reynolds
Attorneys Patented Aug. 18, 1931

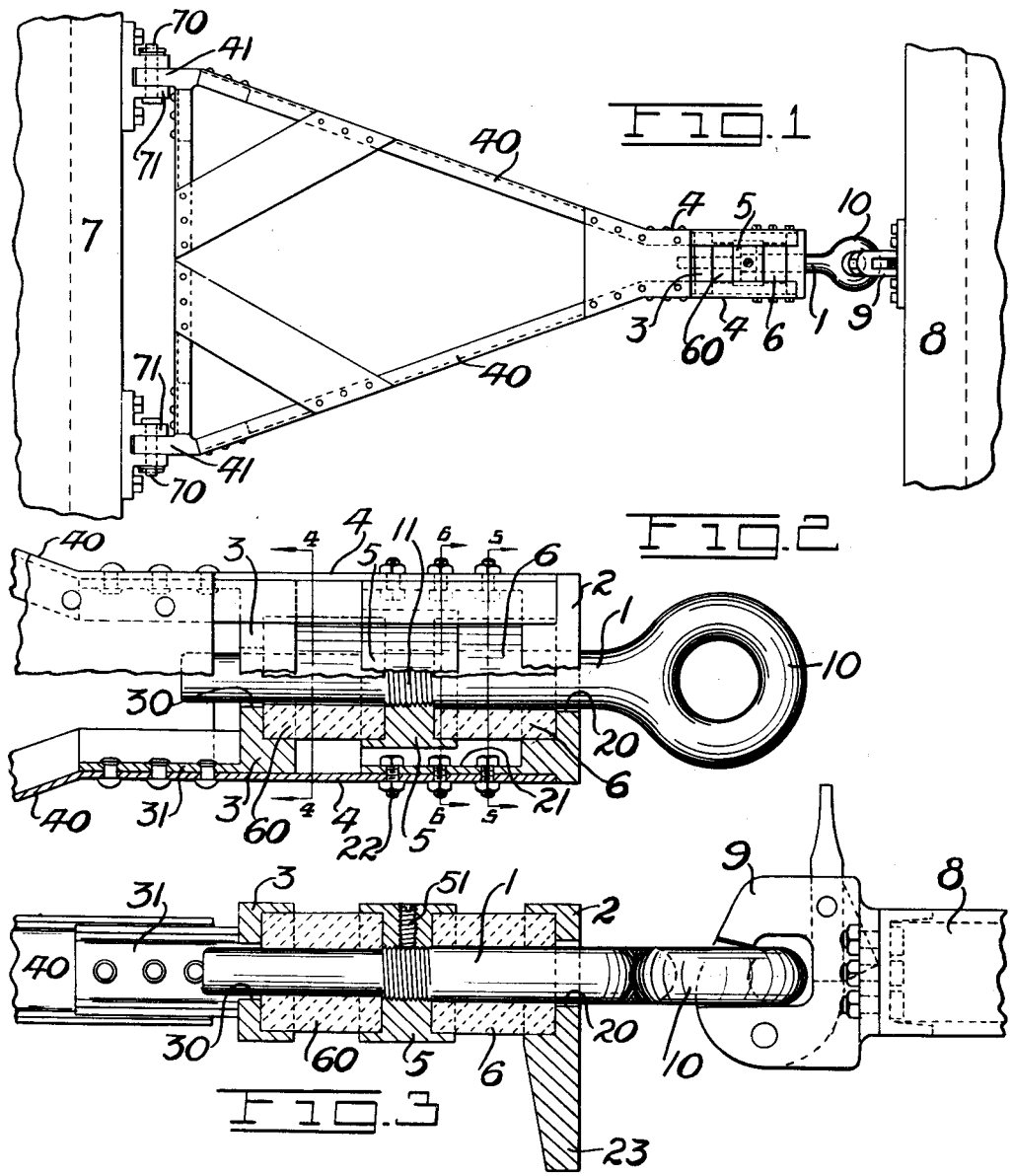

1,819,393

UNITED STATES PATENT OFFICE

EARL B. STALEY, OF SEATTLE, WASHINGTON

DRAWBAR CONNECTION

Application filed May 29, 1929. Serial No. 367,036.

My invention relates generally to road vehicles, and more especially to a drawbar connection for use between trucks and trailers.

Large quantities of goods are now hauled in trucks or vans with trailers. The loads thus carried are frequently many tons in weight, and the devising of a drawbar connection which will handle such heavy loads, especially under the conditions of freedom of movement required of road vehicles, and which, at the same time, will not be so heavy or cumbersome as to render their employment difficult from an operating standpoint, has been a source of considerable difficulty. If single springs sufficiently heavy to counteract the stresses involved in hauling such loads at changing paces over moderately rough or hilly country are employed, it is found that they are too stiff to permit such variations as are desirable for normal operation of the tractor and trailer. If a number of springs are employed the connection becomes bulky and cumbersome, and heavier than is convenient to use. Furthermore, lighter springs, and, to a considerable extent, the heavier springs as well, become distorted beyond their limit of resilience in a short time, after which they exert but little resilient effect, and the shocks of drawing these heavy loads are transmitted directly from one chassis to another.

It is an object of my invention, then, to provide a drawbar connection of a flexibility that will permit their use with road vehicles, or with rail vehicles, which includes members inherently resilient and not liable to be distorted beyond their natural resilience, which are light and easily handled, as compared to the spring members heretofore in use, and which, while they may wear out or lose their resilience in time, may be so designed that a fresh member may be readily inserted in place of the worn out member.

More specifically, it is my object to provide a drawbar connection wherein blocks of rubber, or like resilient material, may be inserted as a solid block between the tractor and the trailer, and, in addition, to provide a mounting and connection for these rubber blocks, whereby, should they lose their life or become damaged, they may be replaced without serious difficulty.

It is a further object to provide a drawbar connection of the kind described which can be applied either to the forward end of a trailer or to the rear end of a tractor or truck, utilizing, in effect, the same special pieces to economize in the manufacture of the device, which can be easily disassembled for replacement of parts, and which is adaptable either to permit the draft bolt employed to swivel freely in the connection or to be held against swiveling therein, as the occasion may require.

My invention comprises the novel parts and the novel combination and arrangement thereof, as shown in the accompanying drawings, described in the specification, and as will be particularly defined by the claims which terminate the same.

In the accompanying drawings I have shown my invention embodied in forms which are now preferred by me.

Figure 1 is a plan view of a trailer tongue, and portions of the chassis of the trailer and truck, showing my drawbar connection applied thereto.

Figure 2 is a view, partly in plan and partly in section, showing the same connection.

Figure 3 is an axial section through the connection, taken at right angles to Figure 2, and illustrating in greater detail the trailer hitch.

Figures 4, 5, and 6 are sections on the respective lines 4—4, 5—5, and 6—6 of Figure 2.

Figure 7 is a plan view, with parts broken away, of my invention as applied to the rear end of a truck chassis.

Figure 8 is a section on line 8—8 of Figure 7.

Drawbar connections include some form of draft bolt, such as the bolt 1, which is provided with means for attachment to a corresponding draft member, as the hook 9. The form of this connection is largely immaterial, and it is sufficient for present purposes to note that the bolt 1 as shown herein has a solid eye 10, which may be connected to the hook 9, the latter being of any suitable form. That illustrated is shown and described in my Patent No. 1,690,558. This form of hook is shown as attached to the chassis 8 of a truck which forms the tractor.

The shank of the bolt 1 is passed through two end thrust members 2 and 3, which are provided with apertures 20 and 30, respectively, to receive and guide the bolts 1. These end thrust members are spaced from each other longitudinally of the bolt, but must be tied together in some manner, so that there is no appreciable separation between the two. This result may be variously accomplished, but as shown herein each of these members is provided with a pair of opposite, angularly disposed wings 21 and 31, respectively, which are adapted to be secured to a pair of spaced side plates or frame members 4. These frame members 4 in effect form a box, in conjunction with the end thrust members 2 and 3, and this box may be suitably connected to the trailer. In the construction illustrated in Figures 1 to 5 inclusive the side frame members 4 may be themselves extended rearwardly, preferably at an angle, as indicated at 40, and be suitably braced and connected together to form a tongue frame which has pivot ears 41 cooperating with like ears 71 of a trailer chassis 7, or the steering or draft mechanism thereof, being pivoted to these ears by pins 70, so that the trailer may be drawn through the extensions 40, and the tongue frame formed thereby.

Between the end thrust members 2 and 3 a collar 5 is secured upon the shank of the draft bolt 1. This collar may take the form of a nut, threaded to be received upon corresponding threads 11 upon the bolt, the portion of the bolt shank outwardly of these threads being reduced to permit ready passage of the nut 5 to a point where it engages the threads 11. Preferably, a set screw 51 is employed, passing through the collar or nut 5 to engage the bolt 1 to hold the nut in position thereon against rotation relative thereto. Between this collar 5 and each of the end thrust members 2 and 3 blocks of a resilient material, such as rubber, are interposed. These are indicated at 6 and 60. The end thrust members may be recessed, and the collar 5 may be similarly recessed, as is best seen in Figure 3, to receive the ends of these blocks 6 and 60.

It will be understood that with the arrangement thus described a pull on the bolt 1 from the truck chassis 8 will be transmitted to the rubber block 6 by the collar 5 as the bolt 1 tends to move forward. The shock is cushioned by the block 6, and transmitted through this resilient block to the end thrust member 2, and thence, through the connection of the latter to the frame members 4, to the trailer 7.

Since the hitch hook 9 is shown as bolted solidly to the truck chassis 8, the bolt 1 must be free to swivel in its connection, to permit weaving of the trailer chassis with respect to the truck chassis, and this may be accomplished by making the collar 5 round, as may be seen in Figure 6, and by avoiding any connection between this collar and the end thrust members or the frame members 4. Should the trailer overtake the truck, as in going down a hill, the thrust of the trailer is transmitted through the end thrust member 3 to the rubber block 60, and thence to the collar 5 and bolt 1. Thus, there is a constant give and take in the resilient blocks 6 and 60, and the shocks of starting, stopping, changing pace, and going up and down hill, are taken up resiliently through these rubber block members.

Rubber which is being constantly stressed and relieved has no appreciable tendency to lose its life with lapse of time, but due to the possibility of damage to these blocks 6 and 60 it is desirable that they be readily replaceable, and to this end I provide means whereby the drawbar assembly may be easily disassembled whenever this may be required. To this end the end thrust member 2 may be connected to the side frame members 4, not by riveting, as the member 3 is connected (see Figure 2 and 3), but by means of bolts 22. When it is desired to renew the blocks it is necessary only to remove the bolts 22, whereupon the entire bolt, with the end thrust member 2, the collar 5, and the rubber blocks or buffers 6 and 60 assembled thereon, may be withdrawn. The replacement of the rubber buffers is then a slight task, as is the reassembly of the device.

At times it may be found desirable to assemble such a device in the rear end of a truck chassis, as is seen in Figure 7. To permit this the rear frame member of the truck may be drilled to permit passage therethrough of the bolt 1', and on the inside of the chassis two side frame members 44, which may be in effect continuous straps or channels, are secured, as by the bolts 45. To these the end thrust members 2 and 3, formed substantially as previously described, may be secured. Instead of extending the side frame members 44 rearwardly, it may be sometimes found desirable to brace them, by braces 84, to a connection at the sides of the truck chassis. The same bolts 22 which hold in place the end thrust member 2 may be employed to attach the rear ends of these braces. To the projecting end of the bolt 1' is secured a hitch hook 9, or like member, cooperating with a bolt 1, on the trailer.

Now, if it is desired to disassemble the drawbar connection, it is necessary only to remove the bolts 45 and the bolts 22, and the entire frame, consisting of the members 44 and such members as tie them together, may be withdrawn, leaving the draft bolt 1', and all of the parts assembled thereon, intact. Its disassembly is then a comparatively simple matter, as before.

In such a case as this, if the draft connection at the trailer is swiveled, it will be found desirable to prevent the draft bolt 1' from swiveling in the drawbar connection described, and to this end I have shown the collar 5 as provided with wings 50, engaging with the wings 21 of the end thrust member 2, as may be seen in Figure 8. If the collar 5 is secured by a set screw to the shank of the draft bolt 1', it is obvious that this bolt cannot turn, yet may reciprocate without difficulty.

It is desirable that the side frame members 4 be made channel-shaped in section, and thus embrace between the flanges of the channel the wings 21 and 31, respectively, of the end thrust members.

The depending toe 23 on the end thrust member 2 is merely a means of supporting the tongue and the draft connection from the ground, so that the end of the bolt 1 will not strike the ground, and perhaps be bent or otherwise injured thereby. This, of course, is used only on the tongue of a trailer, and will be omitted when the connection is used on the truck or tractor.

While designed particularly for road tractors and trailers, this connection is useful for rail vehicles, for in these it will be subjected to less strenuous use than in road vehicles, since the latter are more frequently started and stopped, go over more abrupt and hilly terrain, and the roadbed can never be so smooth as a railroad. In rail vehicles the rubber blocks will take up the load of a long train without shock, and as the stress is relieved by the cars gathering headway, they will gradually expand, without shock.

What I claim as my invention is:

1. A drawbar connection comprising, in combination with the shank of a draft bolt adapted to be coupled to a complemental draft member, a collar secured on said shank intermediate its ends, and having a projecting wing, a pair of end members apertured to receive the opposite ends of said shank, means for coupling said end members together to prevent their relative endwise movement, said means engaging with the wing on said collar to prevent swiveling of the collar and shank, and resilient buffers interposed between said collar and each of said end members.

2. The drawbar connection of claim 1, the collar being threaded and secured on the shank, and the side members being of channel shape to receive the wing on the collar between the flanges thereof, and one of said end members being removably secured in place to permit removal endwise of the assembled drawbar, collar, and buffers.

Signed at Seattle, Washington this 16th day of May, 1929.

EARL B. STALEY.